US012574784B2

(12) United States Patent (10) Patent No.: US 12,574,784 B2
Chen                                    (45) Date of Patent:        Mar. 10, 2026

(54) RESOURCE MEASUREMENT ADJUSTMENT METHOD AND APPARATUS, TERMINAL, AND READABLE STORAGE MEDIUM

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 351 days.

(21) Appl. No.: 18/305,924

(22) Filed: Apr. 24, 2023

(65) Prior Publication Data

US 2023/0262509 A1      Aug. 17, 2023

Related U.S. Application Data

(63) Continuation of application No. PCT/CN2021/127934, filed on Nov. 1, 2021.

(30) Foreign Application Priority Data

Nov. 5, 2020    (CN) .......................... 202011225117.1

(51) Int. Cl.
*H04W 24/10*        (2009.01)
*H04B 17/309*       (2015.01)
*H04L 43/16*        (2022.01)

(52) U.S. Cl.
CPC .......... *H04W 24/10* (2013.01); *H04B 17/309* (2015.01); *H04L 43/16* (2013.01)

(58) Field of Classification Search
CPC ....... H04B 17/309; H04L 43/12; H04L 43/16; H04W 24/08; H04W 24/10; H04W 36/0069; H04W 36/0085; H04W 36/085
See application file for complete search history.

(56) References Cited

U.S. PATENT DOCUMENTS

| | | | | |
|---|---|---|---|---|
| 9,736,735 | B2 * | 8/2017 | Jung ...................... | H04W 24/08 |
| 12,133,121 | B2 * | 10/2024 | Lee ........................ | H04W 48/20 |

(Continued)

FOREIGN PATENT DOCUMENTS

| | | |
|---|---|---|
| CN | 108307686 A | 7/2018 |
| CN | 110708714 A | 1/2020 |

(Continued)

OTHER PUBLICATIONS

U.S. Appl. No. 63/091,700, filed 2020.*

(Continued)

*Primary Examiner* — Dung B Huynh
(74) *Attorney, Agent, or Firm* — BROOKS KUSHMAN P.C.

(57)        ABSTRACT

A resource measurement adjustment method and apparatus, a terminal, and a readable storage medium. The method includes: performing a plurality of first operations on a plurality of resources, where the first operation includes at least one of the following: radio link monitoring RLM, beam failure detection BFD, and radio resource management RRM; and performing measurement adjustment for measurement of the first operation in a case that a preset condition is satisfied; where the preset condition is determined based on at least one of the following: measurement results of a plurality of resources and states of the plurality of resources; and the measurement adjustment includes at least one of measurement relaxation, measurement enhancement, and normal measurement.

20 Claims, 3 Drawing Sheets

(56) References Cited

U.S. PATENT DOCUMENTS

| | | | | |
|---|---|---|---|---|
| 2014/0043988 | A1 | 2/2014 | Chen et al. | |
| 2017/0150384 | A1 | 5/2017 | Rune et al. | |
| 2019/0159051 | A1* | 5/2019 | Takahashi | H04W 72/04 |
| 2019/0289534 | A1* | 9/2019 | Ryoo | H04W 48/18 |
| 2020/0022011 | A1* | 1/2020 | Lee | H04L 1/1607 |
| 2020/0374960 | A1* | 11/2020 | Deenoo | H04W 72/21 |
| 2021/0105643 | A1* | 4/2021 | Kim | H04W 48/16 |
| 2021/0105649 | A1* | 4/2021 | Lee | H04W 24/10 |
| 2021/0392526 | A1* | 12/2021 | Da Silva | H04W 24/02 |
| 2021/0400508 | A1* | 12/2021 | Ohara | H04W 52/0216 |
| 2022/0014943 | A1* | 1/2022 | Zhang | H04W 36/0085 |
| 2022/0053350 | A1* | 2/2022 | Chen | H04W 24/08 |
| 2022/0095223 | A1* | 3/2022 | Ohara | H04W 52/0229 |
| 2022/0104044 | A1* | 3/2022 | Huang | H04W 24/08 |
| 2022/0116802 | A1* | 4/2022 | Kim | H04W 76/27 |
| 2022/0124514 | A1* | 4/2022 | Lee | H04W 74/0841 |
| 2022/0167370 | A1* | 5/2022 | Chen | H04W 48/16 |
| 2022/0174608 | A1* | 6/2022 | Laselva | H04W 24/08 |
| 2022/0217565 | A1* | 7/2022 | Thangarasa | H04W 56/0015 |
| 2022/0217734 | A1* | 7/2022 | Chen | H04W 24/08 |
| 2022/0225147 | A1* | 7/2022 | Chen | H04W 76/28 |
| 2022/0232471 | A1* | 7/2022 | Laselva | H04W 24/10 |
| 2022/0248244 | A1* | 8/2022 | Chen | H04B 7/0695 |
| 2022/0295318 | A1* | 9/2022 | Hwang | H04W 48/12 |
| 2022/0322234 | A1* | 10/2022 | Niu | H04W 24/10 |
| 2022/0353763 | A1* | 11/2022 | Li | H04W 24/08 |
| 2022/0386161 | A1* | 12/2022 | Xie | H04W 24/10 |
| 2022/0394532 | A1* | 12/2022 | Thangarasa | H04W 24/10 |
| 2023/0078923 | A1* | 3/2023 | Shi | H04W 52/0258 |
| | | | | 370/311 |
| 2023/0092967 | A1* | 3/2023 | Huang | H04W 36/0085 |
| | | | | 370/331 |
| 2023/0109703 | A1* | 4/2023 | Sun | H04W 52/0245 |
| | | | | 370/329 |
| 2023/0130963 | A1* | 4/2023 | Yao | H04B 17/336 |
| | | | | 370/329 |
| 2023/0134018 | A1* | 5/2023 | Li | H04W 64/006 |
| | | | | 370/329 |
| 2023/0199881 | A1* | 6/2023 | Freda | H04L 5/001 |
| | | | | 370/329 |
| 2023/0217276 | A1* | 7/2023 | Chen | H04W 24/10 |
| | | | | 370/252 |
| 2023/0239761 | A1* | 7/2023 | Wang | H04W 36/0088 |
| | | | | 370/331 |
| 2023/0262509 | A1* | 8/2023 | Chen | H04B 17/309 |
| 2023/0276321 | A1* | 8/2023 | Da Silva | H04W 36/0088 |
| | | | | 370/252 |
| 2023/0370876 | A1* | 11/2023 | Jeong | H04W 8/24 |
| 2023/0397019 | A1* | 12/2023 | Chen | H04W 52/02 |
| 2023/0397282 | A1* | 12/2023 | Thangarasa | H04W 76/19 |
| 2024/0015657 | A1* | 1/2024 | Chen | H04L 27/26025 |
| 2024/0015844 | A1* | 1/2024 | Cui | H04W 76/28 |
| 2024/0056825 | A1* | 2/2024 | Zhang | H04B 7/0628 |
| 2024/0056903 | A1* | 2/2024 | Nishant | H04W 36/00835 |
| 2024/0073982 | A1* | 2/2024 | Wallentin | H04W 76/15 |
| 2024/0137136 | A1* | 4/2024 | Sogabe | H04B 17/328 |
| 2024/0196328 | A1* | 6/2024 | He | H04W 76/28 |
| 2024/0267768 | A1* | 8/2024 | Dalsgaard | H04W 8/22 |
| 2024/0284206 | A1* | 8/2024 | Elshafie | H04W 24/10 |
| 2024/0284234 | A1* | 8/2024 | Niu | H04W 52/0245 |
| 2024/0306016 | A1* | 9/2024 | Kazmi | H04B 7/0602 |
| 2024/0314879 | A1* | 9/2024 | Jeong | H04W 8/22 |
| 2024/0349096 | A1* | 10/2024 | Hu | H04W 24/10 |
| 2024/0388984 | A1* | 11/2024 | Lee | H04W 36/0085 |
| 2024/0421925 | A1* | 12/2024 | Xu | H04L 5/006 |
| 2025/0081019 | A1* | 3/2025 | Li | H04W 88/06 |
| 2025/0113235 | A1* | 4/2025 | He | H04W 8/24 |
| 2025/0119765 | A1* | 4/2025 | Koskinen | H04W 24/08 |
| 2025/0126563 | A1* | 4/2025 | Niu | H04W 52/0229 |
| 2025/0150852 | A1* | 5/2025 | Cui | H04W 76/28 |
| 2025/0150875 | A1* | 5/2025 | Li | H04W 76/20 |
| 2025/0167903 | A1* | 5/2025 | Hu | H04B 17/382 |
| 2025/0227496 | A1* | 7/2025 | Gürsu | H04W 56/0015 |
| 2025/0260498 | A1* | 8/2025 | Huang | H04B 17/328 |
| 2025/0267497 | A1* | 8/2025 | Yang | H04W 24/10 |

FOREIGN PATENT DOCUMENTS

| | | |
|---|---|---|
| CN | 111757346 A | 10/2020 |
| CN | 111800800 A | 10/2020 |
| EP | 3937541 A | 1/2022 |
| WO | 2020200120 A1 | 10/2020 |

OTHER PUBLICATIONS

International Search Report and Written Opinion for Application No. PCT/CN2021/127934, dated Jan. 20, 2022, 8 Pages.

Vivo "Time domain RRM measurement relaxation" 3GPP TSG-RAN WG2 Meeting #106, Reno, USA, May 2019, R2-1905963, 4 Pages.

Sano, Yosuke et al. New Frequency Bands and RF Performance/Radio Resource Control Specifications for 5G Release 15. NTT Docomo Technical Journal vol. 26 No. 3. Nov. 2018. 32 pages.

First Chinese Office Action for Chinese Application No. 202011225117.1 mailed Feb. 7, 2025. 22 pages.

Third Japanese Office Action for Japanese Patent Application No. 2023-526593 dated Apr. 17, 2025. 4 pages.

Extended European Search Report for Application No. 21888527.5, dated Apr. 3, 2024, 11 Pages.

Vivo "UE Power Consumption Reduction in RRM Measurement" 3GPP TSG-RAN WG2 Meeting #105, Athens, Greece, Feb. 2019, R2-1900397, 5 Pages.

First Office Action for Japanese Application No. 2023-526593, dated Apr. 10, 2024, 4 Pages.

LG Electronics "Discussion on UE power consumption reduction in RRM measurements" 3GPP TSG RAN WG1 #96, Athens, Greece, Feb. 2019, R1-1902054, 3 Pages.

MediaTek Inc. "Recommendations on UE adaptation" 3GPP TSG RAN WG1 Meeting #97, Reno, NV, USA, May 2019, R1-1906550, 5 Pages.

Apple "Consideration on Measurement Relaxation" 3GPP TSG-RAN WG2 Meeting #107, Prague, Czech Republic, Aug. 2019, R2-1909869, 2 Pages.

Huawei, HiSilicon "On RRM optimization by reducing the No. of cell/frequency to be measured" 3GPP TSG-RAN WG2 Meeting 107, Prague, Czech Republic, Aug. 2019, R2-1910881, 4 Pages.

Ericsson "Discussions on UE power saving for RLM and BM" 3GPP TSG RAN WG4 Meeting #97-e, Electronic Meeting, Nov. 2020, R4 2016150, 3 Pages.

* cited by examiner

12

Network-side device

11

11

Terminal

Terminal

Perform a plurality of first operations on a plurality of resources ⌐ S202

Perform measurement adjustment for measurement of the first operation in a case that a preset condition is satisfied ⌐ S204

RESOURCE MEASUREMENT ADJUSTMENT METHOD AND APPARATUS, TERMINAL, AND READABLE STORAGE MEDIUM

CROSS-REFERENCE TO RELATED APPLICATIONS

This application is a continuation of PCT International Application No. PCT/CN2021/127934 filed on Nov. 1, 2021, which claims priority to Chinese Patent Application No. 202011225117.1 filed on Nov. 5, 2020, which are incorporated herein by reference in their entireties.

TECHNICAL FIELD

This application relates to the field of communication technologies, in particular to a resource measurement adjustment method and apparatus, a terminal, and a readable storage medium.

BACKGROUND

At present, in a mobile communication system, when physical downlink control channel (PDCCH) or an advance indication signal indicates not monitoring the PDCCH, the terminal still needs to wake up from a discontinuous reception (DRX) sleep state to perform radio link monitoring (RLM) and/or beam failure detection (BFD), that is, RLM and/or BFD in the prior art is implemented according to a default rule, resulting in inflexible implementation of RLM and/or BFD.

SUMMARY

Embodiments of the application provide a resource measurement adjustment method and apparatus, a terminal, and a readable storage medium.

According to a first aspect, a resource measurement adjustment method is provided, including: performing a plurality of first operations on a plurality of resources, where the first operation includes at least one of the following: radio link monitoring (RLM), beam failure detection (BFD), and radio resource management (RRM); and performing measurement adjustment for measurement of the first operation in a case that a preset condition is satisfied; where the preset condition is determined based on at least one of the following: measurement results of a plurality of resources and states of the plurality of resources; and the measurement adjustment includes at least one of measurement relaxation, measurement enhancement, and normal measurement.

According to a second aspect, a resource measurement adjustment apparatus is provided, including: an execution module, configured to execute a plurality of first operations on a plurality of resources, where the first operation includes at least one of the following: radio link monitoring (RLM), beam failure detection (BFD), and radio resource management (RRM); and an adjustment module, configured to perform measurement adjustment for measurement of the first operation in a case that a preset condition is satisfied; where the preset condition is determined based on at least one of the following: measurement results of a plurality of resources and states of the plurality of resources; and the measurement adjustment includes at least one of measurement relaxation, measurement enhancement, and normal measurement.

According to a third aspect, a terminal is provided, where the terminal includes a processor, a memory, and a program or instructions stored in the memory and capable of running on the processor, and when the program or the instructions are executed by the processor, the steps of the method according to the first aspect are implemented.

According to a fourth aspect, a computer-readable storage medium is provided, where a program or instructions are stored in the computer-readable storage medium, and when the program or the instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions of a network-side device to implement the method according to the first aspect.

According to a sixth aspect, a computer program product is provided, where the computer program product is stored in a non-transitory storage medium, and the computer program product is executed by at least one processor to implement the method according to the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE) or LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation ($6^{th}$ Generation, 6G) communications system.

Figure 1:
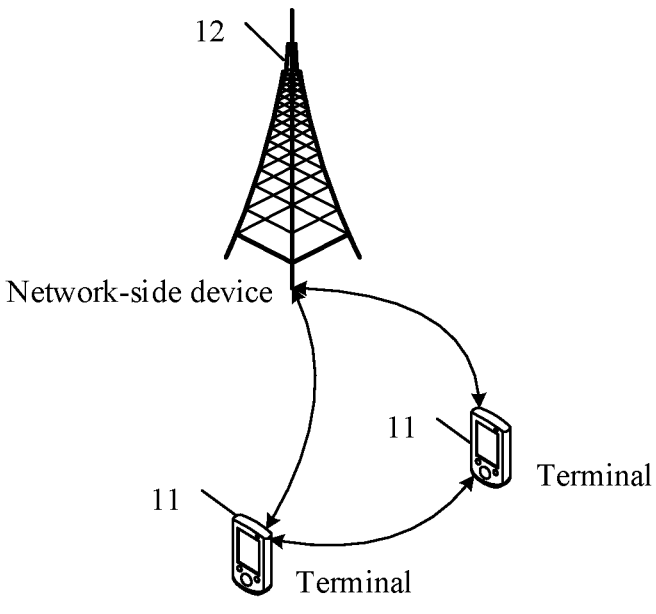
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer (Laptop Computer) or a notebook computer, a personal digital assistant (PDA), a palmtop computer, a netbook, an ultra-mobile personal computer (UMPC), a mobile Internet device (MID), a wearable device (Wearable Device) or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The terminology in this application is first interpreted accordingly.

I. Functions of Radio Link Monitoring (RLM) and Radio Link Failure (RLF)

For RLM and RLF, LTE or NR systems all provide the RLM function. For the RLM function in LTE, UE monitors a radio link by measuring a signal to interference plus noise ratio (SINR) of part of cell reference signals (CRS) on the PDCCH. When part of CRS reference signals of the PDCCH measured are less than a specific threshold, the radio link is determined to be "out-of-sync". In this case, the physical layer notifies the higher layer (Radio Resource Control (RRC) layer) of an out-of-sync (OOS) indication. If the RRC layer has N consecutive out-of-sync indications, the UE starts a Timer T1 (T310).

When part of CRS reference signals of the PDCCH measured are greater than a specific threshold, the radio link is determined to be "in-sync". In this case, the physical layer notifies the higher layer (RRC layer) of an in-sync (IS) indication, and if the RRC layer has M consecutive in-sync indications, the UE stops running of the timer T1.

If the timer T1 expires, the UE determines presence of an RLF.

The "out-of-sync" and "in-sync" counts are configured by the network, that is, N or M. A running time of a timer started after the count is reached can also be configured by the network side.

Regarding BFD

In the future fifth-generation (5 Generation, 5G) mobile communication system, in order to achieve the goals of a downlink transmission rate of 20 Gbps and an uplink transmission rate of 10 Gbps, high-frequency communication and massive antenna technologies are introduced. The high-frequency communication provides a wider system bandwidth and a smaller antenna size, facilitating deployment of massive antennas in base stations and UEs. High-frequency communication features disadvantages of high path loss, proneness to interference, and vulnerability of links. However, the massive antenna technology can provide a large antenna gain. Therefore, combination of the high-frequency communication and the massive antenna is an inevitable trend of the future 5G mobile communication systems. However, not all problems of high-frequency communication, such as vulnerability of links, can be resolved by using the massive antenna technology. When blocking occurs in high-frequency communication, the beam failure recovery mechanism can be used for quickly beam switching to switch a communication link from a poorer beam to a better beam, avoiding a radio link failure and effectively improving robustness of the link.

The beam failure recovery mechanism for UE includes the following content:

(1) beam failure detection;

(2) identifying a new candidate beam;

(3) sending a beam failure recovery request; and (4) monitoring a gNB response for the beam failure recovery request.

Identifying a new candidate beam may be performed before or after beam failure detection.

At present, the beam failure (Beam failure) detection procedure is as follows: The physical layer indicates a beam failure instance (BFI) to the media access control (MAC) layer after determining that a specific condition (for example, all received signals on a beam are less than a threshold) is satisfied. The MAC layer counts the number of BFIs periodically indicated by the physical layer (PHY) and determines whether the beam fails. There are two specific counting manners:

Manner (1): In a case of continuous or discontinuous N instances, it is determined that the beam fails.

Manner (2): The counter is incremented by 1 if one instance is received within one timer. Once the instance is received, the timer starts or restarts. If no instance has been received when a timer expires, the counter is reset. When the counter reaches a preset number of times, it is determined that the beam fails.

The following describes in detail a resource measurement adjustment method provided in the embodiments of this application by using specific embodiments and application scenarios thereof with reference to the accompanying drawings.

Figure 2:
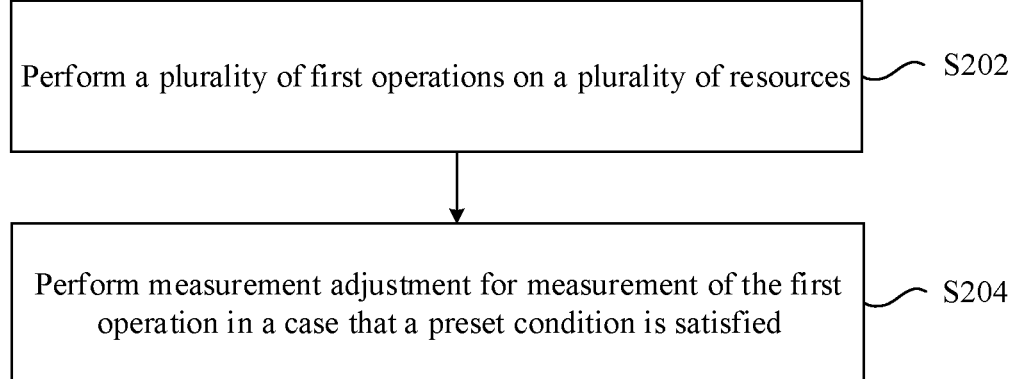
FIG. 2 is a flowchart of a resource measurement adjustment method according to an embodiment of this application.

An embodiment of this application provides a resource measurement adjustment method, which is executed by a terminal. FIG. 2 is a flowchart of a resource measurement adjustment method according to an embodiment of this application. As shown in FIG. 2, the method includes the following steps.

Step S202: Perform a plurality of first operations on a plurality of resources, where the first operation includes at least one of the following: radio link monitoring (RLM), beam failure detection (BFD), and radio resource management (RRM).

Step S204: Perform measurement adjustment for measurement of the first operation in a case that a preset condition is satisfied.

The preset condition is determined based on at least one of the following: measurement results of a plurality of resources and states of the plurality of resources.

The measurement adjustment includes at least one of measurement relaxation, measurement enhancement, and normal measurement.

With step S202 and step S204 in this embodiment of this application, adjustment of measurement relaxation, measurement enhancement, and normal measurement can be performed for RLM, BFD, or RRM measurement based on the measurement results of the plurality of resources and/or the states of the plurality of resources. To be specific, currently required measurement can be determined based on the measurement results of the plurality of resources and/or the states of the plurality of resources, that is, adjusting from measurement relaxation to measurement enhancement, or from measurement enhancement to measurement relaxation, or the like. In this way, measurement relaxation and enhancement are implemented based on measurement results of resources of the terminal and states of the resources. This resolves the prior-art problems of wasting terminal power consumption and degrading system performance caused by RLM, BFD, or RRM implemented according to a rule specified by a protocol and requirements.

It should be noted that resources in this embodiment of this application may include at least one of the following: beam (beam), bandwidth part (BWP), component carrier (CC), carrier (Carrier), cell (cell), cell group (CG), reference signal (RS), and transmission and reception point (TRP).

Regarding cells, being in a plurality of cells means being in a carrier aggregation (CA) scenario, that is, being in a primary cell (Pcell) and a secondary cell (Scell); or being in a DC with CA scenario, that is, being in a primary secondary cell (Pscell) and an Scell. Regarding cell groups, being in a plurality of cell groups means being in a dual connectivity (DC) or DC with CA scenario, that is, being in a master cell group (MCG) and a secondary cell group (SCG), or being in part or all of cells in the MCG and in part or all cells in the SCG, for example, being in a Pcell and Pscell or being in a Pcell/Scell and Pscell/Scell.

In an optional implementation of this embodiment of this application, the measurement result of the resource includes at least one of the following: a measurement performance value of the resource, a variation of measurement performance of the resource, and a change amount of measurement performance of the resource.

The variation of measurement performance of the resource is one of the following: a difference between a current measurement performance value of the resource and a previous measurement performance value, and a variation of resource measurement performance within a first preset time period. The previous measurement performance value may be values of one or more previous times.

The change amount of measurement performance of the resource is one of the following: a difference between a current measurement performance value of the resource and a first reference measurement performance value, and a difference between beam measurement performance in a second preset time period and a second reference measurement performance value.

The first reference measurement performance value or the second reference measurement performance value is one of the following: a value configured by a network side, a value specified by a protocol, a used reference measurement performance value, a previous measurement performance value, a weighted average result of the used reference measurement performance value and the previous measurement performance value, and a weighted average result of the used reference measurement performance value and the current measurement performance value. Specifically, the reference value may be one of the following: the last reference value or a measurement performance value used in a previous comparison, a previous measurement performance value, a weighted average of the last reference value and the current measurement performance value, and a weighted average of the last reference value and the previous measurement performance value.

It should be noted that the measurement performance in this embodiment of this application includes at least one of the following that is obtained by performing measurement on reference signals corresponding to the first operation: reference signal received power (RSRP), reference signal received quality (RSRQ), received signal strength indication (RSSI), and signal to interference plus noise ratio (SINR).

The reference signal includes at least one of the following: synchronization signal block (SSB), channel state information reference signal (CSI-RS), demodulation reference signal (DMRS), cell reference signal (CRS), uplink sounding reference signal (SRS), and positioning reference signal (PRS).

In an optional implementation of this embodiment of this application, a manner of performing measurement adjustment for measurement of the first operation in a case that a preset condition is satisfied in step S204 may further include:

step S204-11: if the measurement results of the plurality of resources satisfy a first preset condition, switch to measurement relaxation of the first operation, or if the measurement results of the plurality of resources satisfy a second preset condition, switch to normal measurement of the first operation;

or step S204-12: if the measurement results of the plurality of resources satisfy a second preset condition, switch to measurement enhancement of the first operation; or if the measurement results of the plurality of resources satisfy the first preset condition, switch to normal measurement of the first operation;

or step S204-13: if the measurement results of the plurality of resources satisfy the first preset condition, switch to measurement relaxation of the first operation; or, if the measurement results of the plurality of resources satisfy the second preset condition, switch to measurement enhancement of the first operation.

The first preset condition is different from the second preset condition, and judgment on the first preset condition and/or the second preset condition is performed based on the measurement results of the plurality of resources.

It can be learned that with the foregoing steps S204-11 to S204-13, measurement of the first operation can be adjusted accordingly based on measurement results of the plurality of resources in a case that different preset conditions are satisfied. In addition, in different application scenarios, corresponding measurement adjustment for a same preset condition may be different. For example, when the first preset condition is satisfied, it may be switched to measurement relaxation for the first operation, or may be switched to measurement enhancement for the first operation. Switching to measurement relaxation can achieve the purpose of power saving. A specific switching result can be set according to actual situations.

Optionally, the first preset condition in this embodiment of this application includes at least one of the following:

(1) the number of first resources in the measurement results of the plurality of resources is not less than a first threshold value, where a measurement result of the first resource is not less than a first threshold;

(2) the number of second resources in the measurement results of the plurality of resources is not greater than a second threshold value, where a measurement result of the second resource is not greater than a second threshold;

(3) a largest measurement value in the measurement results of the plurality of resources is not less than a third threshold;

(4) a smallest measurement value in the measurement results of the plurality of resources is not less than a fourth threshold;

(5) the number of third resources in the measurement results of the plurality of resources is not less than a third threshold value, where a variation or change amount in the measurement results of the third resource is not greater than a fifth threshold;

(6) the number of fourth resources in the measurement results of the plurality of resources is not greater than a fourth threshold value, where a variation or change amount in the measurement results of the fourth resource is not less than a sixth threshold;

(7) a largest measurement variation or change amount in the measurement results of the plurality of resources is not greater than a seventh threshold; and (8) measurement variations or change amounts of a preset number of resources in the measurement results of the plurality of resources are not greater than an eighth threshold.

Optionally, the second preset condition in this embodiment of this application includes at least one of the following:

(1) the number of fifth resources in the measurement results of the plurality of resources is not greater than a fifth threshold value, where a measurement result of the fifth resource is not less than a ninth threshold;

(2) the number of sixth resources in the measurement results of the plurality of resources is not less than a sixth threshold value, where a measurement result of the sixth resource is not greater than a tenth threshold;

(3) a largest measurement value in the measurement results of the plurality of resources is not greater than an eleventh threshold;

(4) a smallest measurement value in the measurement results of the plurality of resources is not greater than a twelfth threshold;

(5) the number of seventh resources in the measurement results of the plurality of resources is not less than a seventh threshold value, where a variation or change amount of a measurement result of the seventh resource is not less than a thirteenth threshold;

(6) the number of eighth resources in the measurement results of the plurality of resources is not greater than an eighth threshold value, where a variation or change amount of a measurement result of the eighth resource is not greater than a fourteenth threshold;

(7) a largest measurement variation or change amount in the measurement results of the plurality of resources is not less than a fifteenth threshold; and (8) measurement variations or change amounts of a preset number of resources in the measurement results of the plurality of resources are not less than a sixteenth threshold.

Optionally, the threshold value (for example, the first threshold value to the eighth threshold value) in this embodiment of this application is determined in the following manners: being configured by a network-side device or being specified by a protocol. For example, the first threshold value may be a number corresponding to all resources and configured by the network-side device, or a number corresponding to part of resources in all resources. The first threshold value may alternatively be a number corresponding to all resources and specified by a protocol, or a number corresponding to part of resources in all resources. Other threshold values are also determined in a similar manner.

It should be noted that the measurement results, the variations of the measurement results, and the change amounts of the measurement results in the first preset condition and the second preset condition are compared with corresponding thresholds within a preset time or a preset number of periods.

In another optional implementation of this embodiment of this application, a manner of performing measurement adjustment for measurement of the first operation in a case that a preset condition is satisfied in step S204 of this embodiment of this application may further include:

step S204-21: if a measurement result of a first resource in the plurality of resources satisfies a third preset condition, switch to measurement relaxation for the first operation on the first resource; or if measurement on the first resource in the plurality of resources satisfies a fourth preset condition, switch to normal measurement of the first operation on the first resource;

or step S204-22: if the measurement result of the first resource in the plurality of resources satisfies the fourth preset condition, switch to measurement enhancement for the first operation on the first resource; or if measurement on the first resource in the plurality of resources satisfies the third preset condition, switch to normal measurement of the first operation on the first resource;

or step S204-23: if the measurement result of the first resource in the plurality of resources satisfies the third preset condition, switch to measurement relaxation for the first operation on the first resource; or if measurement on the first resource in the plurality of resources satisfies the fourth preset condition, switch to measurement enhancement for the first operation on the first resource.

The third preset condition is different from the fourth preset condition, and judgment on the third preset condition and/or the fourth preset condition is performed based on the measurement result of the first resource in the plurality of resources.

It can be learned that with the foregoing steps S204-21 to S204-23, measurement of the first operation on the first resource can be adjusted accordingly based on the measurement result of the first resource in the plurality of resources in a case that different preset conditions are satisfied. In addition, in different application scenarios, corresponding measurement adjustment for a same preset condition may be different. For example, when the first preset condition is satisfied, it may be switched to measurement relaxation for the first operation on the first resource, or may be switched to measurement enhancement for the first operation on the first resource. A specific switching result can be set according to actual situations. The first resource may be any resource in the plurality of resources, and for example, may be one of a plurality of beams, one of a plurality of bandwidth parts, or one of BWPs, which is not limited in this application. In other words, for each resource, whether to adjust current measurement can be determined based on its own measurement result.

Optionally, the third preset condition in this embodiment of this application includes at least one of the following:

(1) a measurement result of the first resource is not less than a seventeenth threshold;

(2) the measurement result of the first resource or a preset number of measurement samples of the first resource within a first preset time period or a preset number of periods is not less than an eighteenth threshold; and (3) the preset number of measurement samples of the first resource within the first preset time period or the preset number of periods is not less than a nineteenth threshold.

Optionally, the fourth preset condition in this embodiment of this application includes at least one of the following:

(1) a measurement result of the first resource is not greater than a twentieth threshold;

(2) the measurement result or a preset number of measurement samples of the first resource within a first preset time period or a preset number of periods is not greater than a twenty-first threshold; and (3) the preset number of measurement samples of the first resource within the first preset time period or the preset number of periods is not greater than a twenty-second threshold.

It should be noted that in the foregoing third preset condition and fourth preset condition, the measurement result or the preset number of measurement samples of the first resource within the preset number of periods means that neither the measurement result nor the preset number of measurement samples of the first resource within a consecutive preset number of periods is less than the eighteenth threshold or greater than the twenty-first threshold; or the measurement result or the preset number of measurement samples of the first resource within the first preset time period means that neither the measurement result nor the preset number of measurement samples within the first preset time period is continuously less than the nineteenth threshold or greater than the twenty-second threshold.

In an optional implementation of this embodiment of this application, a manner of performing measurement adjustment for the first operation in a case that a preset condition is satisfied in step S204 may further include:

step S204-31: if a state of a first resource in the plurality of resources satisfies a fifth preset condition, switch to measurement relaxation for the first operation on the first resource; or if the state of the first resource in the plurality of resources satisfies a sixth preset condition, switch to normal measurement of the first operation on the first resource;

or step S204-32: if the state of the first resource in the plurality of resources satisfies the sixth preset condition, switch to measurement enhancement for the first operation on the first resource; or if the state of the first resource in the plurality of resources satisfies the fifth preset condition, switch to normal measurement of the first operation on the first resource;

or step S204-33: if the state of the first resource in the plurality of resources satisfies the fifth preset condition, switch to measurement relaxation for the first operation on the first resource; or if the state of the first resource in the plurality of resources satisfies the sixth preset condition, switch to measurement enhancement for the first operation on the first resource.

It can be learned that with the foregoing steps S204-31 to S204-33, measurement of the first operation on the first resource can be adjusted accordingly based on the state of the first resource in the plurality of resources in a case that different preset conditions are satisfied. In addition, in different application scenarios, corresponding measurement adjustment for a same preset condition may be different. For example, when the first preset condition is satisfied, it may be switched to measurement relaxation for the first operation on the first resource, or may be switched to measurement enhancement for the first operation on the first resource. A specific switching result can be set according to actual situations.

Optionally, the fifth preset condition in this embodiment of this application includes at least one of the following:

(1) a second operation has been performed for the first resource;

(2) the first resource has fallen back from a carrier aggregation state to a single cell state;

(3) the first resource has fallen back from a dual connectivity state to a single cell group state;

(4) a second operation has been performed for a secondary cell corresponding to the first resource; and (5) a second operation has been performed for a secondary cell group corresponding to the first resource.

The second operation being performed includes at least one of the following: release (release), deactivate (deactivated), suspend (suspend), and dormancy (dormancy).

Specifically, the fifth preset condition may be at least one of the following in specific application scenarios:

(1) A related resource (for example, Scell, SCG, SpCell, RS, BWP, beam, carrier, or TRP) is released, deactivated, suspended, and dormant.

(2) A Pcell in carrier aggregation (CA) being performing the first operation (RLM, BFD, or RRM) has fallen back to a single cell state, that is, an Scell is released, suspended, deactivated, or dormant.

(3) A Pcell or Pscell in a dual-connectivity (DC) being performing the first operation (RLM, BFD, or RRM) has fallen back to a single cell group state, that is, an SCG or a PScell is suspended, released, or deactivated, or an Scell in an SCG is released, suspended, deactivated, or dormant.

Optionally, the sixth preset condition in this embodiment of this application includes at least one of the following:

(1) a third operation has been performed for the first resource;

(2) the first resource has been switched from a single cell state to a carrier aggregation state;

(3) the first resource has been switched from a single cell group state to a dual connectivity state;

(4) a third operation has been performed for a secondary cell corresponding to the first resource; and (5) a third operation has been performed for a secondary cell group corresponding to the first resource.

The third operation being performed includes at least one of the following: configure (configure), activate (activate), resume (resume), and wake up (wake up), or being configured as (non-dormancy).

Specifically, the sixth preset condition is, for example, at least one of the following:

(1) A related resource (for example, Scell, SCG, SpCell, RS, BWP, beam, carrier, or TRP) is configured (configure), activated (activate), resumed (resume), or waken up (wake up), or is configured as (non-dormancy).

(2) A single cell state configured has changed to a carrier aggregation (CA) state, that is, an Scell is configured (configure), activated (activate), resumed (resume), or waken up (wake up), or is configured as (non-dormancy).

(3) In a case that the single-cell group state configured has changed to a dual-connectivity (DC) or DC with CA state, that is, an SCG or a PScell is configured, activated, resumed, or waken up, or is configured as (non-dormancy); or an Scell in the SCG is configured, activated, resumed, or waken up, or is configured as (non-dormancy).

In this embodiment of this application, measurement adjustment for the first operation on the first resource includes at least one of the following:

(1) In a case that there is one first resource, switching to measurement relaxation for the first operation on the first resource, for example, RLM/BFD/RRM measurement relaxation on a corresponding resource, such as RLM/BFD/RRM measurement relaxation on a corresponding beam, BWP, CC, carrier, CG, RS, or TRP.

(2) In a case that there are a plurality of first resources, switching to measurement relaxation for the first operation on part of the plurality of first resources, for example, RLM/BFD/RRM measurement relaxation on corresponding part of beams, part of BWPs, part of CCs (such as Pcell or Scell), part of carriers, PScell, Pcell, or Scell in a CG, part of RSs, or part of TRPs.

(3) In a case that there are a plurality of first resources, switching to measurement relaxation for the first operation on all of the plurality of first resources.

RLM/BFD/RRM measurement relaxation includes at least one of the following:

(1) measurement relaxation for the first operation in time domain;

Measurement relaxation for the first operation in time domain may be applied in specific application scenarios: extension of a measurement period of RLM/BFD measurement L1 (layer 1), or reduction of the number of measurement samples (sample); or use of a measurement period P1 for normal measurement, use of a measurement period P2 for measurement relaxation, and use of a measurement period P3 for measurement enhancement, where P3<P2<P1; or extension of a gap of RLM/BFD measurement L2/L3 indication.

(2) within a first specified time, measurement of the first operation being skipped or measurement of the first operation being reduced;

(3) within a second specified time, upper-layer indication for the first operation being skipped or upper-layer indication for the first operation being reduced;

(4) measurement of the first operation being skipped on a resource that satisfies a corresponding condition of the measurement relaxation; where, further, for example, RLM/BFD measurement being skipped within a period of time or a preset number of periods, or being skipped until normal measurement or measurement enhancement is resumed;

(5) resources for measurement being reduced;

(6) measurement relaxation for the first operation in space domain, that is, beams for measurement of the first operation being reduced or measurement relaxation being performed in corresponding time domain/frequency domain on beams; and (7) the number of reference signals for RLM/BFD measurement being reduced.

In this embodiment of this application, in a case that measurement adjustment is measurement enhancement, at least one of the following is included:

(1) measurement enhancement for the first operation in time domain;

(2) within a first specified time, measurement of the first operation being increased;

(3) within a second specified time, upper-layer indication for the first operation being increased;

(4) measurement of the first operation being increased on a resource that satisfies a corresponding condition of the measurement enhancement;

(5) resources for measurement being increased;

(6) measurement enhancement for the first operation in space domain, that is, beams for measurement of the first operation being increased or measurement enhancement being performed in corresponding time domain/frequency domain on beams; and (7) the number of reference signals measured in the first operation being increased.

It should be noted that reduction for measurement relaxation or increase for measurement enhancement are relative to normal measurement, and normal measurement is measurement performed based on measurement requirements already specified in an existing protocol.

In an optional implementation of this embodiment of this application, the method in this embodiment of this application may further include:

step S208: the terminal sends request information to a network-side device, where the request information includes at least one of the following: a measurement adjustment option for the first operation expected (or requested request, or preferred preferred) by the terminal and a measurement adjustment related parameter for the first operation expected by the terminal; and the measurement adjustment option includes at least one of the following: measurement relaxation, measurement enhancement, and normal measurement;

or step S210: the terminal receives indication information from a network-side device, where the indication message is used to indicate at least one of the following: whether a current cell supports measurement adjustment for the first operation, an adjustment related parameter of the measurement adjustment, a type of the current cell, and whether the current cell allows the terminal to perform measurement adjustment.

In an optional implementation of this embodiment of this application, the indication message may be included in a SIB message or included in an early indication message. The early indication message may include at least one of the following: a wake-up signal (WUS), Go-to-sleep (GTS), and downlink control information (DCI), where the DCI includes scheduling DCI or other newly designed DCI.

The adjustment parameter of the measurement adjustment includes at least one of the following: a value of a related timer and/or a maximum value of a counter after adjustment, a threshold for starting a counter of measurement adjustment, a threshold for exiting a counter of measurement adjustment, a threshold for starting a timer of measurement adjustment or a preset time threshold, a threshold for exiting a timer of measurement adjustment or a preset time threshold, and a measurement configuration after measurement adjustment.

In addition, a measurement adjustment judgment related configuration may be:

(1) per-UE configuration, where the network-side device configures, for each terminal, a separate measurement adjustment judgment related parameter;

(2) per-cell configuration, where the measurement adjustment judgment related parameters configured by the network-side device within coverage of a cell are the same; and the terminal uses related parameters within coverage of the cell;

(3) per-frequency/carrier/band/BWP configuration, where the measurement adjustment judgment related parameters configured by the network-side device within a range of a frequency/carrier/band/BWP are the same;

(4) per-UE per-frequency/carrier/band/BWP configuration, where the measurement adjustment judgment related parameters configured for each terminal by the network-side device within a range of a frequency/carrier/band/BWP are the same; and (5) per-beam configuration, that is, measurement application corresponding to the beam.

It should be noted that the resource measurement adjustment method provided in the embodiments of this application may be executed by a resource measurement adjustment apparatus or by a control module for executing the resource measurement adjustment method in the resource measurement adjustment apparatus. In the embodiments of this application, the resource measurement adjustment apparatus provided by the embodiments of this application is described by using an example in which the resource measurement adjustment apparatus executes the resource measurement adjustment method.

Figure 3:
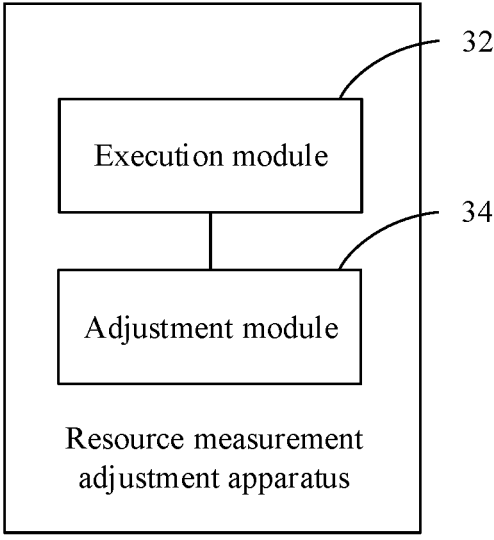
FIG. 3 is a schematic structural diagram of a resource measurement adjustment apparatus according to an embodiment of this application.

An embodiment of this application further provides a resource measurement adjustment apparatus. FIG. 3 is a schematic structural diagram of a resource measurement adjustment apparatus according to an embodiment of this application. As shown in FIG. 3, the apparatus includes:

an execution module 32: configured to execute a plurality of first operations on a plurality of resources, where the first operation includes at least one of the following: radio link monitoring (RLM), beam failure detection (BFD), and radio resource management (RRM); and an adjustment module 34, configured to perform measurement adjustment for measurement of the first operation in a case that a preset condition is satisfied; where the preset condition is determined based on at least one of the following: measurement results of a plurality of resources and states of the plurality of resources; and the measurement adjustment includes at least one of measurement relaxation, measurement enhancement, and normal measurement.

The apparatus in this embodiment of this application is capable of performing adjustment of measurement relaxation, measurement enhancement, and normal measurement for RLM, BFD, or RRM measurement based on the measurement results of the plurality of resources and/or the states of the plurality of resources. To be specific, currently required measurement can be determined based on the measurement results of the plurality of resources and/or the states of the plurality of resources, that is, adjusting from measurement relaxation to measurement enhancement, or from measurement enhancement to measurement relaxation, or the like. In this way, measurement relaxation and enhancement are implemented based on measurement results of resources of the terminal and states of the resources. This resolves the prior-art problems of wasting terminal power consumption and degrading system performance caused by RLM, BFD, or RRM implemented according to a rule specified by a protocol and requirements.

In an optional implementation of this embodiment of this application, the adjustment module 34 may further include:

a first switching unit, configured to: if the measurement results of the plurality of resources satisfy a first preset condition, switch to measurement relaxation of the first operation, or if the measurement results of the plurality of resources satisfy a second preset condition, switch to normal measurement of the first operation;

or a second switching unit, configured to: if the measurement results of the plurality of resources satisfy the second preset condition, switch to measurement enhancement of the first operation, or if the measurement results of the plurality of resources satisfy the first preset condition, switch to normal measurement of the first operation;

or a third switching unit, configured to: if the measurement results of the plurality of resources satisfy the first preset condition, switch to measurement relaxation of the first operation; or if the measurement results of the plurality of resources satisfy the second preset condition, switch to measurement enhancement of the first operation; where the first preset condition is different from the second preset condition, and judgment on the first preset condition and/or the second preset condition is performed based on the measurement results of the plurality of resources.

Optionally, the first preset condition includes at least one of the following:

(1) the number of first resources in the measurement results of the plurality of resources is not less than a first threshold value, where a measurement result of the first resource is not less than a first threshold;

(2) the number of second resources in the measurement results of the plurality of resources is not greater than a second threshold value, where a measurement result of the second resource is not greater than a second threshold;

(3) a largest measurement value in the measurement results of the plurality of resources is not less than a third threshold;

(4) a smallest measurement value in the measurement results of the plurality of resources is not less than a fourth threshold;

(5) the number of third resources in the measurement results of the plurality of resources is not less than a third threshold value, where a variation or change amount in the measurement results of the third resource is not greater than a fifth threshold;

(6) the number of fourth resources in the measurement results of the plurality of resources is not greater than a fourth threshold value, where a variation or change amount in the measurement results of the fourth resource is not less than a sixth threshold;

(7) a largest measurement variation or change amount in the measurement results of the plurality of resources is not greater than a seventh threshold; and (8) measurement variations or change amounts of a preset number of resources in the measurement results of the plurality of resources are not greater than an eighth threshold.

Optionally, the second preset condition includes at least one of the following:

(1) the number of fifth resources in the measurement results of the plurality of resources is not greater than a fifth threshold value, where a measurement result of the fifth resource is not less than a ninth threshold;

(2) the number of sixth resources in the measurement results of the plurality of resources is not less than a sixth threshold value, where a measurement result of the sixth resource is not greater than a tenth threshold;

(3) a largest measurement value in the measurement results of the plurality of resources is not greater than an eleventh threshold;

(4) a smallest measurement value in the measurement results of the plurality of resources is not greater than a twelfth threshold;

(5) the number of seventh resources in the measurement results of the plurality of resources is not less than a seventh threshold value, where a variation or change amount of a measurement result of the seventh resource is not less than a thirteenth threshold;

(6) the number of eighth resources in the measurement results of the plurality of resources is not greater than an eighth threshold value, where a variation or change amount of a measurement result of the eighth resource is not greater than a fourteenth threshold;

(7) a largest measurement variation or change amount in the measurement results of the plurality of resources is not less than a fifteenth threshold; and (8) measurement variations or change amounts of a preset number of resources in the measurement results of the plurality of resources are not less than a sixteenth threshold.

Optionally, the threshold value in this embodiment of this application is determined based on at least one of the following: being configured by a network-side device and being specified by a protocol.

Optionally, the measurement result, a variation of the measurement result, and a change amount of the measurement result within a preset time or a preset number of periods are compared with corresponding thresholds.

In an optional implementation of this embodiment of this application, the adjustment module 34 may further include: a fourth switching unit, configured to: if a measurement result of a first resource in the plurality of resources satisfies a third preset condition, switch to measurement relaxation for the first operation on the first resource; or if measurement on the first resource in the plurality of resources satisfies a fourth preset condition, switch to normal measurement of the first operation on the first resource;

or a fifth switching unit, configured to: if the measurement result of the first resource in the plurality of resources satisfies the fourth preset condition, switch to measurement enhancement for the first operation on the first resource; or if measurement on the first resource in the plurality of resources satisfies the third preset condition, switch to normal measurement of the first operation on the first resource;

or a sixth switching unit, configured to: if the measurement result of the first resource in the plurality of resources satisfies the third preset condition, switch to measurement relaxation for the first operation on the first resource; or if measurement on the first resource in the plurality of resources satisfies the fourth preset condition, switch to measurement enhancement for the first operation on the first resource; where the third preset condition is different from the fourth preset condition, and judgment on the third preset condition and/or the fourth preset condition is performed based on the measurement result of the first resource in the plurality of resources.

Optionally, the third preset condition in this embodiment of this application includes at least one of the following:

(1) a measurement result of the first resource is not less than a seventeenth threshold;

(2) the measurement result of the first resource or a preset number of measurement samples of the first resource within a first preset time period or a preset number of periods is not less than an eighteenth threshold; and (3) the preset number of measurement samples of the first resource within the first preset time period or the preset number of periods is not less than a nineteenth threshold.

Optionally, the fourth preset condition in this embodiment of this application includes at least one of the following:

(1) a measurement result of the first resource is not greater than a twentieth threshold;

(2) the measurement result or a preset number of measurement samples of the first resource within a first preset time period or a preset number of periods is not greater than a twenty-first threshold; and (3) the preset number of measurement samples of the first resource within the first preset time period or the preset number of periods is not greater than a twenty-second threshold.

Optionally, the measurement result or the preset number of measurement samples of the first resource within the preset number of periods means that neither the measurement result nor the preset number of measurement samples of the first resource within a consecutive preset number of periods is less than the eighteenth threshold or greater than the twenty-first threshold; or the measurement result or the preset number of measurement samples of the first resource within the first preset time period means that neither the measurement result nor the preset number of measurement samples within the first preset time period is continuously less than the nineteenth threshold or greater than the twenty-second threshold.

In an optional implementation of this embodiment of this application, the adjustment module 34 may further include: a seventh switching unit, configured to: if a state of a first resource in the plurality of resources satisfies a fifth preset condition, switch to measurement relaxation for the first operation on the first resource; or if the state of the first resource in the plurality of resources satisfies a sixth preset condition, switch to normal measurement of the first operation on the first resource;

or an eighth switching unit, configured to: if the state of the first resource in the plurality of resources satisfies the sixth preset condition, switch to measurement enhancement for the first operation on the first resource; or if the state of the first resource in the plurality of resources satisfies the fifth preset condition, switch to normal measurement of the first operation on the first resource;

or a ninth switching unit, configured to: if the state of the first resource in the plurality of resources satisfies the fifth preset condition, switch to measurement relaxation for the first operation on the first resource; or if the state of the first resource in the plurality of resources satisfies the sixth preset condition, switch to measurement enhancement for the first operation on the first resource.

Optionally, the fifth preset condition in this embodiment of this application includes at least one of the following:

(1) the first resource has fallen back from a carrier aggregation state to a single cell state;

(2) the first resource has fallen back from a dual connectivity state to a single cell group state;

(3) a second operation has been performed for a secondary cell corresponding to the first resource;

(4) a second operation has been performed for a secondary cell group corresponding to the first resource; and (5) a second operation has been performed for the first resource.

The second operation being performed includes at least one of the following: release, deactivate, suspend, and dormancy.

Optionally, the sixth preset condition in this embodiment of this application includes at least one of the following:

(1) a third operation has been performed for the first resource;

(2) the first resource has been switched from a single cell state to a carrier aggregation state;

(3) the first resource has been switched from a single cell group state to a dual connectivity state;

(4) a third operation has been performed for a secondary cell corresponding to the first resource; and (5) a third operation has been performed for a secondary cell group corresponding to the first resource.

The third operation being performed includes at least one of the following: configure, activate, resume, and non-dormancy.

Optionally, in this embodiment of this application, the switching to measurement adjustment for the first operation on the first resource includes at least one of the following:

in a case that there is one first resource, switching to measurement adjustment for the first operation on the first resource;

in a case that there are a plurality of first resources, switching to measurement adjustment for the first operation on part of the plurality of first resources; and in a case that there are a plurality of first resources, switching to measurement adjustment for the first operation on all of the plurality of first resources.

Optionally, in a case that measurement adjustment is measurement relaxation, at least one of the following is included:

(1) measurement relaxation for the first operation in time domain;

(2) within a first specified time, measurement of the first operation being skipped or measurement of the first operation being reduced;

(3) within a second specified time, upper-layer indication for the first operation being skipped or upper-layer indication for the first operation being reduced;

(4) measurement of the first operation being skipped on a resource that satisfies a corresponding condition of the measurement relaxation;

(5) resources for measurement being reduced;

(6) measurement relaxation for the first operation in space domain, that is, beams for measurement of the first operation being reduced or measurement relaxation being performed in corresponding time domain/frequency domain on beams; and (7) the number of reference signals measured in the first operation being reduced.

In a case that measurement adjustment is measurement enhancement, at least one of the following is included:

(1) measurement enhancement for the first operation in time domain;

(2) within a first specified time, measurement of the first operation being increased;

(3) within a second specified time, upper-layer indication for the first operation being increased;

(4) measurement of the first operation being increased on a resource that satisfies a corresponding condition of the measurement enhancement;

(5) resources for measurement being increased;

(6) measurement enhancement for the first operation in space domain, that is, beams for measurement of the first operation being increased or measurement enhancement being performed in corresponding time domain/frequency domain on beams; and (7) the number of reference signals measured in the first operation being increased.

Optionally, in this embodiment of this application, the measurement result of the resource includes at least one of the following: a measurement performance value of the resource, a variation of measurement performance of the resource, and a change amount of measurement performance of the resource.

The variation of measurement performance of the resource is one of the following: a difference between a current measurement performance value of the resource and a previous measurement performance value, and a variation of resource measurement performance within a first preset time period.

The change amount of measurement performance of the resource is one of the following: a difference between a current measurement performance value of the resource and a first reference measurement performance value, and a difference between beam measurement performance in a second preset time period and a second reference measurement performance value.

The first reference measurement performance value or the second reference measurement performance value is one of the following: a value configured by a network side, a value specified by a protocol, a used reference measurement performance value, a previous measurement performance value, and a weighted average result of the used reference measurement performance value and the previous measurement performance value.

The measurement performance includes at least one of the following that is obtained by performing measurement on reference signals corresponding to the first operation: reference signal received power (RSRP), reference signal received quality (RSRQ), received signal strength indication (RSSI), and signal to interference plus noise ratio (SINR); and the reference signal includes at least one of the following: synchronization signal block (SSB), channel state information reference signal (CSI-RS), demodulation reference signal (DMRS), cell reference signal (CRS), and uplink sounding reference signal (SRS).

Optionally, the apparatus in this embodiment of this application may further include:

a sending module, configured to send request information to a network-side device, where the request information includes at least one of the following: a measurement adjustment option for the first operation expected by the terminal and a measurement adjustment related parameter for the first operation expected by the terminal; and the measurement adjustment option includes at least one of the following: measurement relaxation, measurement enhancement, and normal measurement; or a receiving module, configured to receive indication information from a network-side device, where the indication message is used to indicate at least one of the following: whether a current cell supports measurement adjustment for the first operation, an adjustment related parameter of the measurement adjustment, a type of the current cell, and whether the current cell allows the terminal to perform measurement adjustment.

The adjustment parameter of the measurement adjustment includes at least one of the following: a value of a related timer and/or a maximum value of a counter after adjustment, a threshold for starting a counter of measurement adjustment, a threshold for exiting a counter of measurement adjustment, a threshold for starting a timer of measurement adjustment or a preset time threshold, a threshold for exiting a timer of measurement adjustment or a preset time threshold, and a measurement configuration after measurement adjustment.

Optionally, the resource in this embodiment of this application includes at least one of the following: beam (beam), bandwidth part (BWP), component carrier (CC), carrier (Carrier), cell (cell), cell group (CG), reference signal (RS), and transmission reception point (TRP).

The resource measurement adjustment apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The resource measurement adjustment apparatus in this embodiment of this application may be an apparatus with an operating system. The operating system may be an Android (Android) operating system, an iOS operating system, or other possible operating systems, and is not specifically limited in the embodiments of this application.

The resource measurement adjustment apparatus provided in this embodiment of this application can implement the processes implemented in the method embodiment in FIG. 2, with the same technical effects achieved. To avoid repetition, details are not described herein again.

Figure 4:
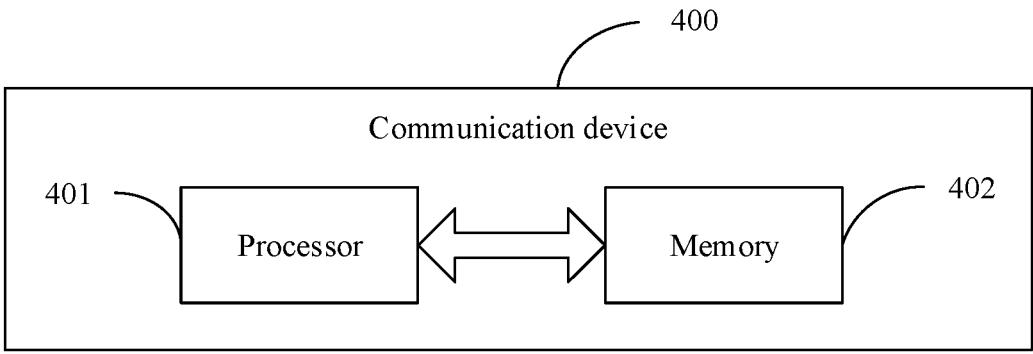
FIG. 4 is a schematic structural diagram of a communication device according to an embodiment of this application.

Optionally, as shown in FIG. 4, an embodiment of this application further provides a communication device 400, including a processor 401, a memory 402, and a program or instructions stored in the memory 402 and capable of running on the processor 401. For example, when the communication device 400 is a terminal and when the program or the instructions are executed by the processor 401, the processes of the foregoing embodiment of the resource measurement adjustment method are implemented, with the same technical effects achieved. When the communication device 400 is a network-side device and when the program or the instructions are executed by the processor 401, the processes of the foregoing embodiment of the resource measurement adjustment method are implemented, with the same technical effects achieved. To avoid repetition, details are not described herein again.

Figure 5:
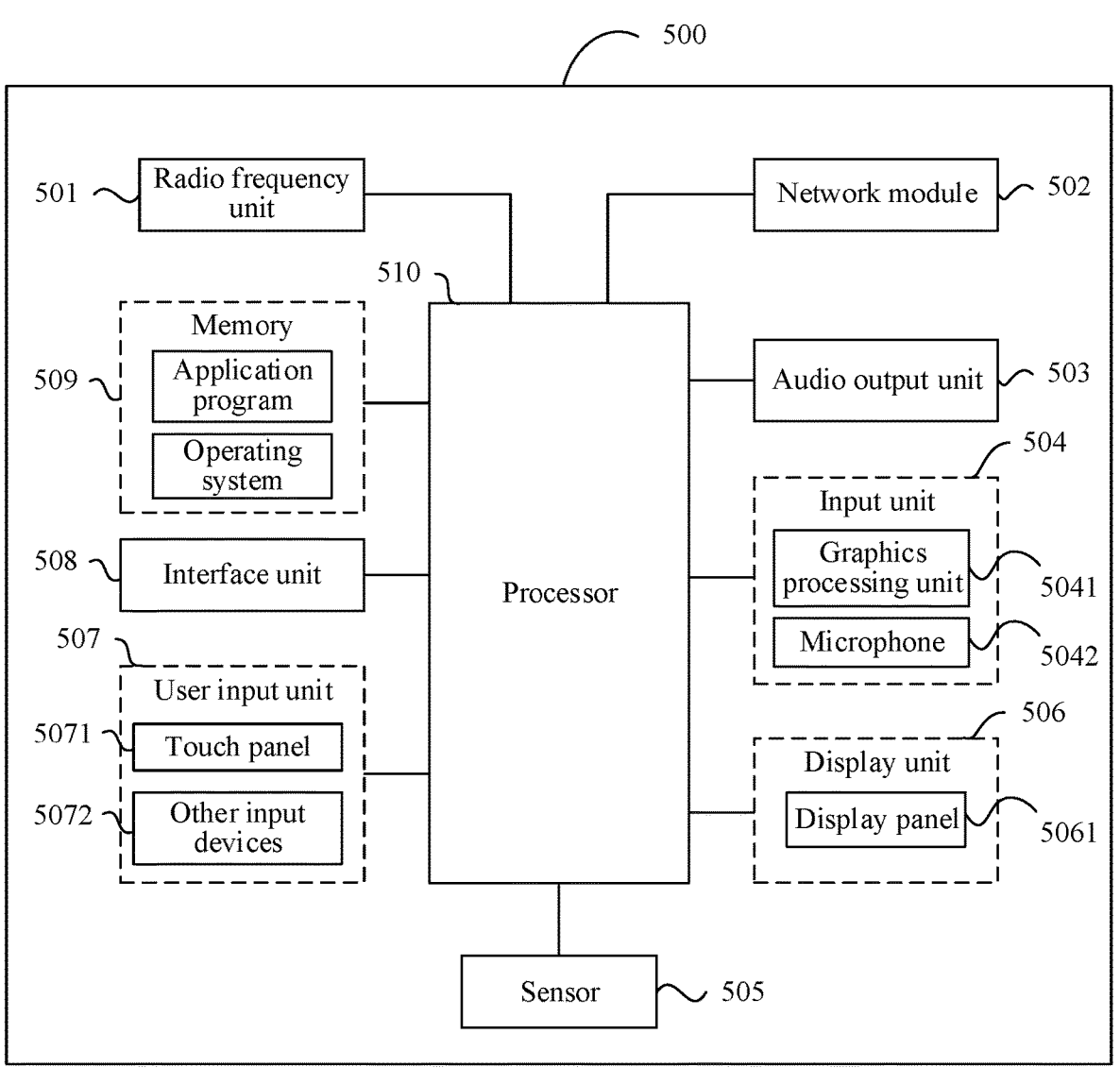
FIG. 5 is a schematic structural diagram of a terminal according to an embodiment of this application.

FIG. 5 is a schematic diagram of a hardware structure of a terminal for implementing the embodiments of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (for example, a battery) supplying power to the components, and the power supply may be logically connected to the processor 510 through a power management system. In this way, functions such as charge management, discharge management, and power consumption management are implemented by using the power management system. The structure of the terminal shown in FIG. 5 does not constitute any limitation on the terminal. The terminal may include more or fewer components than shown in FIG. 5, or a combination of some components, or the components disposed differently. Details are not described herein again.

It can be understood that in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, and the like. The user input unit 507 may include a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function key (such as a volume control key or a power on/off key), a trackball, a mouse, a joystick, and the like. Details are not described herein.

In this embodiment of this application, the radio frequency unit 501 receives downlink data from a network-side device, and then sends the downlink data to the processor 510 for processing; and also sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may include a program or instruction storage area and a data storage area. The program or instruction storage area may store an operating system, an application program or instruction required by at least one function (for example, a sound playback function or an image playback function), and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 510 may include one or more processing units. Optionally, an application processor and a modem processor may be integrated in the processor 110. The application processor primarily processes an operating system, user interfaces, application programs or instructions, and the like. The modem processor primarily processes radio communication, for example, being a baseband processor. It can be understood that the modem processor may alternatively be not integrated in the processor 510.

The processor 510 is configured to perform a plurality of first operations on a plurality of resources, where the first operation includes at least one of the following: radio link monitoring (RLM), beam failure detection (BFD), and radio resource management (RRM).

The processor 510 is further configured to perform measurement adjustment for measurement of the first operation in a case that a preset condition is satisfied.

The preset condition is determined based on at least one of the following: measurement results of a plurality of resources and states of the plurality of resources; and the measurement adjustment includes at least one of measurement relaxation, measurement enhancement, and normal measurement.

The terminal in this embodiment of this application is capable of performing adjustment of measurement relaxation, measurement enhancement, and normal measurement for RLM, BFD, or RRM measurement based on the measurement results of the plurality of resources and/or the states of the plurality of resources. To be specific, currently required measurement can be determined based on the measurement results of the plurality of resources and/or the states of the plurality of resources, that is, adjusting from measurement relaxation to measurement enhancement, or from measurement enhancement to measurement relaxation, or the like. In this way, measurement relaxation and enhancement are implemented based on measurement results of resources of the terminal and states of the resources. This resolves the prior-art problems of wasting terminal power consumption and degrading system performance caused by RLM, BFD, or RRM implemented according to a rule specified by a protocol and requirements.

An embodiment of this application further provides a readable storage medium. The readable storage medium may be volatile or non-volatile. A program or instructions are stored in the readable storage medium. When the program or the instructions are executed by a processor, the processes of the foregoing embodiment of the resource measurement adjustment method can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing resource measurement adjustment method embodiments, with the same technical effects achieved. To avoid repetition, details are not described herein again.

An embodiment of this application provides a computer program product, where the computer program product is stored in a non-transitory storage medium, and when being executed by at least one processor, the computer program product is configured to implement the processes of the foregoing resource measurement adjustment method embodiments, with the same technical effects achieved. To avoid repetition, details are not repeated herein.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A resource measurement adjustment method, executed by a terminal, wherein the method comprises:

performing a plurality of first operations on a plurality of resources, wherein the first operation comprises at least one of the following: radio link monitoring (RLM), beam failure detection (BFD), and radio resource management (RRM); and performing measurement adjustment for measurement of the first operation in a case that a preset condition is satisfied; wherein the preset condition is determined based on measurement results of a plurality of resources; and the performing measurement adjustment for measurement of the first operation in a case that a preset condition is satisfied comprises:

if the measurement results of the plurality of resources satisfy a first preset condition, switching to measurement relaxation of the first operation, wherein the first preset condition comprises: a largest measurement value in the measurement results of the plurality of resources is not less than a third threshold.

2. The method according to claim 1, wherein the performing measurement adjustment for measurement of the first operation in a case that a preset condition is satisfied further comprises:

if the measurement results of the plurality of resources satisfy a second preset condition, switching to normal measurement of the first operation;

or if the measurement results of the plurality of resources satisfy the second preset condition, switching to measurement enhancement of the first operation; or if the measurement results of the plurality of resources satisfy the first preset condition, switching to normal measurement of the first operation;

or if the measurement results of the plurality of resources satisfy the first preset condition, switching to measurement relaxation of the first operation; or if the measurement results of the plurality of resources satisfy the second preset condition, switching to measurement enhancement of the first operation; wherein the first preset condition is different from the second preset condition, and judgment on the first preset condition and/or the second preset condition is performed based on the measurement results of the plurality of resources.

3. The method according to claim 2, wherein the first preset condition further comprises at least one of the following:

the number of first resources in the measurement results of the plurality of resources is not less than a first threshold value, wherein a measurement result of the first resource is not less than a first threshold;

the number of second resources in the measurement results of the plurality of resources is not greater than a second threshold value, wherein a measurement result of the second resource is not greater than a second threshold;

a smallest measurement value in the measurement results of the plurality of resources is not less than a fourth threshold;

the number of third resources in the measurement results of the plurality of resources is not less than a third threshold value, wherein a variation or change amount in the measurement results of the third resource is not greater than a fifth threshold;

the number of fourth resources in the measurement results of the plurality of resources is not greater than a fourth

23 threshold value, wherein a variation or change amount in the measurement results of the fourth resource is not less than a sixth threshold;

a largest measurement variation or change amount in the measurement results of the plurality of resources is not greater than a seventh threshold; and measurement variations or change amounts of a preset number of resources in the measurement results of the plurality of resources are not greater than an eighth threshold.

4. The method according to claim 2, wherein the second preset condition comprises at least one of the following:

the number of fifth resources in the measurement results of the plurality of resources is not greater than a fifth threshold value, wherein a measurement result of the fifth resource is not less than a ninth threshold;

the number of sixth resources in the measurement results of the plurality of resources is not less than a sixth threshold value, wherein a measurement result of the sixth resource is not greater than a tenth threshold;

a largest measurement value in the measurement results of the plurality of resources is not greater than an eleventh threshold;

a smallest measurement value in the measurement results of the plurality of resources is not greater than a twelfth threshold;

the number of seventh resources in the measurement results of the plurality of resources is not less than a seventh threshold value, wherein a variation or change amount of a measurement result of the seventh resource is not less than a thirteenth threshold;

the number of eighth resources in the measurement results of the plurality of resources is not greater than an eighth threshold value, wherein a variation or change amount of a measurement result of the eighth resource is not greater than a fourteenth threshold;

a largest measurement variation or change amount in the measurement results of the plurality of resources is not less than a fifteenth threshold; and measurement variations or change amounts of a preset number of resources in the measurement results of the plurality of resources are not less than a sixteenth threshold.

5. The method according to claim 1, wherein the performing measurement adjustment for the first operation in a case that a preset condition is satisfied further comprises:

if a measurement result of a first resource in the plurality of resources satisfies a third preset condition, switching to measurement relaxation for the first operation on the first resource; or if measurement on the first resource in the plurality of resources satisfies a fourth preset condition, switching to normal measurement of the first operation on the first resource;

or if the measurement result of the first resource in the plurality of resources satisfies the fourth preset condition, switching to measurement enhancement for the first operation on the first resource; or if measurement on the first resource in the plurality of resources satisfies the third preset condition, switching to normal measurement of the first operation on the first resource;

or if the measurement result of the first resource in the plurality of resources satisfies the third preset condition, switching to measurement relaxation for the first operation on the first resource; or if measurement on the first resource in the plurality of resources satisfies the fourth preset condition, switching to measurement enhancement for the first operation on the first resource; wherein the third preset condition is different from the fourth preset condition, and judgment on the third preset condition and/or the fourth preset condition is performed based on the measurement result of the first resource in the plurality of resources.

6. The method according to claim 5, wherein the third preset condition comprises at least one of the following:

a measurement result of the first resource is not less than a seventeenth threshold;

the measurement result of the first resource or a preset number of measurement samples of the first resource within a first preset time period or a preset number of periods is not less than an eighteenth threshold; and the preset number of measurement samples of the first resource within the first preset time period or the preset number of periods is not less than a nineteenth threshold;

or wherein the fourth preset condition comprises at least one of the following:

a measurement result of the first resource is not greater than a twentieth threshold;

the measurement result or a preset number of measurement samples of the first resource within a first preset time period or a preset number of periods is not greater than a twenty-first threshold; and the preset number of measurement samples of the first resource within the first preset time period or the preset number of periods is not greater than a twenty-second threshold.

7. The method according to claim 6, wherein the measurement result or the preset number of measurement samples of the first resource within the preset number of periods means that neither the measurement result nor the preset number of measurement samples of the first resource within a consecutive preset number of periods is less than the eighteenth threshold or greater than the twenty-first threshold; or the measurement result or the preset number of measurement samples of the first resource within the first preset time period means that neither the measurement result nor the preset number of measurement samples within the first preset time period is continuously less than the nineteenth threshold or greater than the twenty-second threshold.

8. The method according to claim 1, wherein the preset condition is determined further based on states of the plurality of resources, and the performing measurement adjustment for the first operation in a case that a preset condition is satisfied further comprises:

if a state of a first resource in the plurality of resources satisfies a fifth preset condition, switching to measurement relaxation for the first operation on the first resource; or if the state of the first resource in the plurality of resources satisfies a sixth preset condition, switching to normal measurement of the first operation on the first resource;

or if the state of the first resource in the plurality of resources satisfies the sixth preset condition, switching to measurement enhancement for the first operation on the first resource; or if the state of the first resource in the plurality of resources satisfies the fifth preset condition, switching to normal measurement of the first operation on the first resource; or if the state of the first resource in the plurality of resources satisfies the fifth preset condition, switching to measurement relaxation for the first operation on the first resource; or if the state of the first resource in the plurality of resources satisfies the sixth preset condition, switching to measurement enhancement for the first operation on the first resource.

9. The method according to claim 8, wherein the fifth preset condition comprises at least one of the following:

the first resource has fallen back from a carrier aggregation state to a single cell state;

the first resource has fallen back from a dual connectivity state to a single cell group state;

a second operation has been performed for a secondary cell corresponding to the first resource;

a second operation has been performed for a secondary cell group corresponding to the first resource; and a second operation has been performed for the first resource; wherein the second operation being performed comprises at least one of the following: release, deactivate, suspend, and dormancy.

10. The method according to claim 8, wherein the sixth preset condition comprises at least one of the following:

a third operation has been performed for the first resource;

the first resource has been switched from a single cell state to a carrier aggregation state;

the first resource has been switched from a single cell group state to a dual connectivity state;

a third operation has been performed for a secondary cell corresponding to the first resource; and a third operation has been performed for a secondary cell group corresponding to the first resource; wherein the third operation being performed comprises at least one of the following: configure, activate, resume, and non-dormancy.

11. The method according to claim 8, wherein the switching to measurement adjustment for the first operation on the first resource comprises at least one of the following:

in a case that there is one first resource, switching to measurement adjustment for the first operation on the first resource;

in a case that there are a plurality of first resources, switching to measurement adjustment for the first operation on part of the plurality of first resources; and in a case that there are a plurality of first resources, switching to measurement adjustment for the first operation on all of the plurality of first resources.

12. The method according to claim 11, wherein in a case that measurement adjustment is measurement relaxation, at least one of the following is comprised:

measurement relaxation for the first operation in time domain;

within a first specified time, measurement of the first operation being skipped or measurement of the first operation being reduced;

within a second specified time, upper-layer indication for the first operation being skipped or upper-layer indication for the first operation being reduced;

measurement of the first operation being skipped on a resource that satisfies a corresponding condition of the measurement relaxation;

resources for measurement being reduced;

measurement relaxation for the first operation in space domain; and the number of reference signals measured in the first operation being reduced;

or in a case that measurement adjustment is measurement enhancement, at least one of the following is comprised:

measurement enhancement for the first operation in time domain;

within a first specified time, measurement of the first operation being increased;

within a second specified time, upper-layer indication for the first operation being increased;

measurement of the first operation being increased on a resource that satisfies a corresponding condition of the measurement enhancement;

resources for measurement being increased;

measurement enhancement for the first operation in space domain; and the number of reference signals measured in the first operation being increased.

13. The method according to claim 1, wherein the measurement result of the resource comprises at least one of the following: a measurement performance value of the resource, a variation of measurement performance of the resource, and a change amount of measurement performance of the resource.

14. The method according to claim 13, wherein the variation of measurement performance of the resource is one of the following: a difference between a current measurement performance value of the resource and a previous measurement performance value, and a variation of resource measurement performance within a first preset time period; and the change amount of measurement performance of the resource is one of the following: a difference between a current measurement performance value of the resource and a first reference measurement performance value, and a difference between beam measurement performance in a second preset time period and a second reference measurement performance value; wherein the first reference measurement performance value or the second reference measurement performance value is one of the following: a value configured by a network side, a value specified by a protocol, a used reference measurement performance value, a previous measurement performance value, and a weighted average result of the used reference measurement performance value and the previous measurement performance value.

15. The method according to claim 13, wherein the measurement performance comprises at least one of the following that is obtained by performing measurement on reference signals corresponding to the first operation: reference signal received power (RSRP), reference signal received quality (RSRQ), received signal strength indication (RSSI), and signal to interference plus noise ratio (SINR); and the reference signal comprises at least one of the following: synchronization signal block (SSB), channel state information reference signal (CSI-RS), demodulation reference signal (DMRS), cell reference signal (CRS), and uplink sounding reference signal (SRS).

16. The method according to claim 1, wherein the method further comprises:

sending request information to a network-side device, wherein the request information comprises at least one of the following: a measurement adjustment option for the first operation expected by the terminal and a measurement adjustment related parameter for the first operation expected by the terminal; and the measurement adjustment option comprises at least one of the following: measurement relaxation, measurement enhancement, and normal measurement; or receiving indication information from a network-side device, wherein the indication message is used to indicate at least one of the following: whether a current cell supports measurement adjustment for the first operation, an adjustment related parameter of the measurement adjustment, a type of the current cell, and whether the current cell allows the terminal to perform measurement adjustment.

17. The method according to claim 16, wherein the adjustment parameter of the measurement adjustment comprises at least one of the following:

a value of a related timer and/or a maximum value of a counter after adjustment, a threshold for starting a counter of measurement adjustment, a threshold for exiting a counter of measurement adjustment, a threshold for starting a timer of measurement adjustment or a preset time threshold, a threshold for exiting a timer of measurement adjustment or a preset time threshold, and a measurement configuration after measurement adjustment.

18. The method according to claim 1, wherein the resource comprises at least one of the following: beam, bandwidth part (BWP), component carrier (CC), carrier, cell, cell group (CG), reference signal (RS), and transmission reception point (TRP).

19. A terminal, comprising a processor, a memory, and a program or instructions stored in the memory and capable of running on the processor, wherein the program or the instructions are executed by the processor to perform:

performing a plurality of first operations on a plurality of resources, wherein the first operation comprises at least one of the following: radio link monitoring (RLM), beam failure detection (BFD), and radio resource management (RRM); and performing measurement adjustment for measurement of the first operation in a case that a preset condition is satisfied; wherein the preset condition is determined based on measurement results of a plurality of resources; and the performing measurement adjustment for measurement of the first operation in a case that a preset condition is satisfied comprises:

if the measurement results of the plurality of resources satisfy a first preset condition, switching to measurement relaxation of the first operation, wherein the first preset condition comprises: a largest measurement value in the measurement results of the plurality of resources is not less than a third threshold.

20. A non-transitory readable storage medium, wherein the readable storage medium stores a program or instructions, and the program or the instructions are executed by a processor to perform:

performing a plurality of first operations on a plurality of resources, wherein the first operation comprises at least one of the following: radio link monitoring (RLM), beam failure detection (BFD), and radio resource management (RRM); and performing measurement adjustment for measurement of the first operation in a case that a preset condition is satisfied; wherein the preset condition is determined based on measurement results of a plurality of resources; and the performing measurement adjustment for measurement of the first operation in a case that a preset condition is satisfied comprises:

if the measurement results of the plurality of resources satisfy a first preset condition, switching to measurement relaxation of the first operation, wherein the first preset condition comprises: a largest measurement value in the measurement results of the plurality of resources is not less than a third threshold.

* * * * *